United States Patent
Hua et al.

(10) Patent No.: US 11,507,287 B1
(45) Date of Patent: Nov. 22, 2022

(54) ADDING SINGLE DISKS TO AN ARRAY BY RELOCATING RAID MEMBERS

(71) Applicant: EMC IP HOLDING COMPANY LLC, Hopkinton, MA (US)

(72) Inventors: Kuolin Hua, Natick, MA (US); Kunxiu Gao, Boxborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 6 days.

(21) Appl. No.: 17/330,974

(22) Filed: May 26, 2021

(51) Int. Cl.
*G06F 12/00* (2006.01)
*G06F 3/06* (2006.01)

(52) U.S. Cl.
CPC .......... *G06F 3/0631* (2013.01); *G06F 3/0604* (2013.01); *G06F 3/0634* (2013.01); *G06F 3/0644* (2013.01); *G06F 3/0647* (2013.01); *G06F 3/0689* (2013.01)

(58) Field of Classification Search
CPC .... G06F 3/0631; G06F 3/0604; G06F 3/0634; G06F 3/0644; G06F 3/0647; G06F 3/0689
See application file for complete search history.

(56) References Cited

U.S. PATENT DOCUMENTS

| | | | | |
|---|---|---|---|---|
| 10,671,431 B1 * | 6/2020 | Dolan | .................... | G06F 3/0649 |
| 10,768,830 B1 * | 9/2020 | Gade | ..................... | G06F 3/0689 |
| 11,144,396 B1 * | 10/2021 | Hua | .................... | G06F 11/2094 |
| 11,327,666 B2 * | 5/2022 | Hua | ........................ | G06F 3/067 |
| 11,327,668 B1 * | 5/2022 | Hua | ....................... | G06F 3/0659 |
| 2022/0107729 A1 * | 4/2022 | Hua | ....................... | G06F 3/0644 |

* cited by examiner

*Primary Examiner* — John A Lane
(74) *Attorney, Agent, or Firm* — Anderson Gorecki LLP

(57) ABSTRACT

Protection group members from a cluster of W baseline size disks with RAID (D+P) protection groups associated with W partition indices, where W=D+P, are selected and relocated to a new baseline size disk using a W-by-W relocation sequence matrix. The same relocation sequence matrix is used to select and relocate protection group members from M clusters of baseline size disks to a new disk that has M times the storage capacity of each baseline size disk. A new cluster of multiple size disks is formed when W multiple size disks have been added, after which the W-by-W relocation sequence matrix is used to select and relocate protection group members from the new cluster to additional multiple size disks.

20 Claims, 15 Drawing Sheets

Baseline Disk Cluster 300

| disk\part | 1 | 2 | 3 | 4 | 5 |
|---|---|---|---|---|---|
| 1 | A | B | C | D | E |
| 2 | A | B | C | D | E |
| 3 | A | B | C | D | E |
| 4 | A | B | C | D | E |
| 5 | A | B | C | D | E |

Figure 3

Relocation Sequence Matrix 302

|   | 1 | 2 | 3 | 4 | 5 |
|---|---|---|---|---|---|
| 1 | 2 | 3 | 4 | 5 | 1 |
| 2 | 3 | 4 | 5 | 1 | 2 |
| 3 | 4 | 5 | 1 | 2 | 3 |
| 4 | 5 | 1 | 2 | 3 | 4 |
| 5 | 1 | 2 | 3 | 4 | 5 |

Figure 4

Baseline Disk Cluster 300

| disk\part | 1 | 2 | 3 | 4 | 5 |
|---|---|---|---|---|---|
| 1 | A | B | C | D | 1 |
| 2 | A | B | C | 1 | E |
| 3 | A | B | 1 | D | E |
| 4 | A | 1 | C | D | E |
| 5 | 1 | B | C | D | E |

| | | | | | |
|---|---|---|---|---|---|
| 6 | A | B | C | D | E |

First New Baseline Disk

Figure 5

Baseline Disk Cluster 300

| disk\part | 1 | 2 | 3 | 4 | 5 |
|---|---|---|---|---|---|
| 1 | A | B | C | D | U |
| 2 | A | B | C | U | E |
| 3 | A | B | U | D | E |
| 4 | A | U | C | D | E |
| 5 | U | B | C | D | E |

| | | | | | |
|---|---|---|---|---|---|
| 6 | A | B | C | D | E |

First New Baseline Disk

Figure 6

Baseline Disk Cluster 300

| disk\part | 1 | 2 | 3 | 4 | 5 |
|---|---|---|---|---|---|
| 1 | 2 | B | C | D | U |
| 2 | A | B | C | U | 2 |
| 3 | A | B | U | 2 | E |
| 4 | A | U | 2 | D | E |
| 5 | U | 2 | C | D | E |

| | 1 | 2 | 3 | 4 | 5 |
|---|---|---|---|---|---|
| 6 | A | B | C | D | E |
| 7 | A | B | C | D | E |

First and Second New Baseline Disks

Figure 7

Baseline Disk Cluster 300

| disk\part | 1 | 2 | 3 | 4 | 5 |
|---|---|---|---|---|---|
| 1 | V | W | X | Y | U |
| 2 | W | X | Y | U | V |
| 3 | X | Y | U | V | W |
| 4 | Y | U | V | W | X |
| 5 | U | V | W | X | Y |
| 6 | A | B | C | D | E |
| 7 | A | B | C | D | E |
| 8 | A | B | C | D | E |
| 9 | A | B | C | D | E |
| 10 | A | B | C | D | E |

New Baseline Disk Cluster 310

Figure 8

Baseline Disk Cluster 320

| disk\part | 1 | 2 | 3 | 4 | 5 |
|---|---|---|---|---|---|
| 1 | A | B | C | D | E |
| 2 | A | B | C | D | E |
| 3 | A | B | C | D | E |
| 4 | A | B | C | D | E |
| 5 | A | B | C | D | E |

Baseline Disk Cluster 322

| disk\part | 1 | 2 | 3 | 4 | 5 |
|---|---|---|---|---|---|
| 1 | F | G | H | I | J |
| 2 | F | G | H | I | J |
| 3 | F | G | H | I | J |
| 4 | F | G | H | I | J |
| 5 | F | G | H | I | J |

Figure 9

Relocation Sequence Matrix 324

|   | 1 | 2 | 3 | 4 | 5 |
|---|---|---|---|---|---|
| 1 | 2 | 3 | 4 | 5 | 1 |
| 2 | 3 | 4 | 5 | 1 | 2 |
| 3 | 4 | 5 | 1 | 2 | 3 |
| 4 | 5 | 1 | 2 | 3 | 4 |
| 5 | 1 | 2 | 3 | 4 | 5 |

Figure 10

Baseline Disk Cluster 320　　　　Baseline Disk Cluster 322

| disk\part | 1 | 2 | 3 | 4 | 5 | 1 | 2 | 3 | 4 | 5 |
|---|---|---|---|---|---|---|---|---|---|---|
| 1 | A | B | C | D | 1 | F | G | H | I | 1 |
| 2 | A | B | C | 1 | E | F | G | H | 1 | J |
| 3 | A | B | 1 | D | E | F | G | 1 | I | J |
| 4 | A | 1 | C | D | E | F | 1 | H | I | J |
| 5 | 1 | B | C | D | E | 1 | G | H | I | J |
| 6 | A | B | C | D | E | F | G | H | I | J |

New Double Size Disk 340

Figure 11

Baseline Disk Cluster 320          Baseline Disk Cluster 322

| disk\part | 1 | 2 | 3 | 4 | 5 | 1 | 2 | 3 | 4 | 5 |
|---|---|---|---|---|---|---|---|---|---|---|
| 1 | 2 | B | C | D | 1 | 2 | G | H | I | 1 |
| 2 | A | B | C | 1 | 2 | F | G | H | 1 | 2 |
| 3 | A | B | 1 | 2 | E | F | G | 1 | 2 | J |
| 4 | A | 1 | 2 | D | E | F | 1 | 2 | I | J |
| 5 | 1 | 2 | C | D | E | 1 | 2 | H | I | J |
| 6 | A | B | C | D | E | F | G | H | I | J |
| 7 | A | B | C | D | E | F | G | H | I | J |

New Double Size Disks 340, 342

Figure 12

| disk\part | Baseline Disk Cluster 320 | | | | | Baseline Disk Cluster 322 | | | | |
|---|---|---|---|---|---|---|---|---|---|---|
| | 1 | 2 | 3 | 4 | 5 | 1 | 2 | 3 | 4 | 5 |
| 1 | M | O | Q | S | K | N | P | R | T | L |
| 2 | O | Q | S | K | M | P | R | T | L | N |
| 3 | Q | S | K | M | O | R | T | L | N | P |
| 4 | S | K | M | O | Q | T | L | N | P | R |
| 5 | K | M | O | S | E | L | N | P | R | T |
| 6 | A | B | C | D | E | F | G | H | I | J |
| 7 | A | B | C | D | E | F | G | H | I | J |
| 8 | A | B | C | D | E | F | G | H | I | J |
| 9 | A | B | C | D | E | F | G | H | I | J |
| 10 | A | B | C | D | E | F | G | H | I | J |

New Cluster of Double Size Disks 350

Figure 13

New Cluster of Double Size Disks 350

| disk\part | 1 | 2 | 3 | 4 | 5 | 1 | 2 | 3 | 4 | 5 |
|---|---|---|---|---|---|---|---|---|---|---|
| 6 | A | B | C | D | 1 | F | G | H | I | 1 |
| 7 | A | B | C | 1 | E | F | G | H | 1 | J |
| 8 | A | B | 1 | D | E | F | G | 1 | I | J |
| 9 | A | 1 | C | D | E | F | 1 | H | I | J |
| 10 | 1 | B | C | D | E | 1 | G | H | I | J |
| 11 | A | B | C | D | E | F | G | H | I | J |

New Double Size Disk 352

Figure 14

ADDING SINGLE DISKS TO AN ARRAY BY RELOCATING RAID MEMBERS

TECHNICAL FIELD

The subject matter of this disclosure is generally related to electronic data storage, and more particularly to single disk scaling of a storage system that implements RAID protection groups.

BACKGROUND

The disk drives in a typical mass data storage system are configured to be members of protection groups known as redundant arrays of independent disks (RAID). A RAID protection group helps to avoid data loss by enabling a failed protection group member to be rebuilt on a spare disk using the remaining non-failed members. A RAID (D+P) protection group has D data members and P parity members. The data members store data. The parity members store parity information such as XORs of the data values on the data members. The parity information enables reconstruction of the data in the event that a data member fails. Parity information can be reconstructed from the data on the data members in the event that a parity member fails. A variety of different RAID levels with different numbers, types, and configurations of members are known. A typical data storage system includes multiple RAID protection groups of the same level, with individual disks serving as protection group members.

Most data storage systems enable storage capacity to be increased to accommodate a greater amount of data by adding new disks. The storage capacity of a data storage system that uses individual disks as RAID (D+P) protection group members is increased by adding W new disks, where W=(D+P). All the disks typically have the same storage capacity. For example, a storage system that implements RAID-5 (4+1) is scaled-up in increments of five new disks of the same size as the installed disks. Similarly, a RAID-5 (3+1) is scaled-up in increments of four new disks of the same size as the installed disks. However, as the storage capacity of individual disk drives increases because of technological advances, an increment of W new disks may be undesirably large and inefficient. Moreover, it may be desirable to add new disks that have greater capacity than the installed disks.

SUMMARY

In accordance with some aspects an apparatus comprises a storage array comprising: at least one compute node comprising at least one processor and non-transitory computer-readable memory; a plurality of baseline size non-volatile disks that are accessed by the at least one compute node and used to store data that is accessed via the at least one compute node, each disk configured with W indexed partitions, each partition having a same fixed-size amount of storage capacity equal to storage capacity of other partitions; and a disk manager configured to: create a cluster of W of the baseline size disks with RAID (D+P) protection groups associated with ones of the partition indices, where W=D+P; and responsive to addition of a new baseline size disk, configure the new baseline size disk with W partitions and relocate selected members of the protection groups from the cluster of baseline disks to the new baseline size disk based on a W-by-W relocation sequence matrix.

In accordance with some aspects a method is implemented by a storage array having at least one compute node with at least one processor and non-transitory computer-readable memory, and a plurality of baseline size non-volatile disks that are accessed by the at least one compute node and used to store data that is accessed via the at least one compute node, each disk configured with W indexed partitions, each partition having a same fixed-size amount of storage capacity equal to storage capacity of other partitions, the method comprising: creating a cluster of W of the baseline size disks with RAID (D+P) protection groups associated with ones of the partition indices, where W=D+P; and responsive to addition of a new baseline size disk, configuring the new baseline size disk with W partitions and relocating selected members of the protection groups from the cluster of baseline disks to the new baseline size disk based on a W-by-W relocation sequence matrix.

In accordance with some aspects, a computer-readable storage medium stores instructions that when executed by a storage array having at least one compute node with at least one processor and non-transitory computer-readable memory, and a plurality of baseline size non-volatile disks that are accessed by the at least one compute node and used to store data that is accessed via the at least one compute node, each disk configured with W indexed partitions, each partition having a same fixed-size amount of storage capacity equal to storage capacity of other partitions, cause the storage array to add storage capacity, the method comprising: creating a cluster of W of the baseline size disks with RAID (D+P) protection groups associated with ones of the partition indices, where W=D+P; and responsive to addition of a new baseline size disk, configuring the new baseline size disk with W partitions and relocating selected members of the protection groups from the cluster of baseline disks to the new baseline size disk based on a W-by-W relocation sequence matrix.

All examples, aspects, implementations, and features mentioned in this disclosure can be combined in any technically possible way. Other aspects, features, and implementations may become apparent in view of the detailed description and figures.

BRIEF DESCRIPTION OF THE FIGURES

FIG. 3 illustrates a cluster of baseline size disks.

FIG. 4 illustrates a relocation sequence matrix.

FIG. 5 illustrates use of the relocation sequence matrix to relocate protection group members from the cluster of baseline size disks to a new baseline size disk.

FIG. 6 illustrates creation of a new protection group in the vacated partitions.

FIG. 7 illustrates use of the relocation sequence matrix to relocate protection group members from the cluster of baseline size disks to a second new baseline size disk.

FIG. 8 illustrates creation of a new cluster of baseline size disks from W added baseline size disks.

FIG. 9 illustrates two baseline size disks configured to support adding a new double size disk.

FIG. 10 illustrates a relocation sequence matrix.

FIG. 11 illustrates use of the relocation sequence matrix with the two baseline size disks to relocate protection group members from the baseline size disks to the new double size disk.

FIG. 12 illustrates use of the relocation sequence matrix with the two baseline size disks to relocate protection group members from the baseline size disks to a second new double size disk.

FIG. 13 illustrates creation of a new cluster of double size disks from W added double size disks.

FIG. 14 illustrates use of the relocation sequence matrix with the new cluster of double size disks to relocate protection group members to a new double size disk.

DETAILED DESCRIPTION

The terminology used in this disclosure is intended to be interpreted broadly within the limits of subject matter eligibility. The terms "disk" and "drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
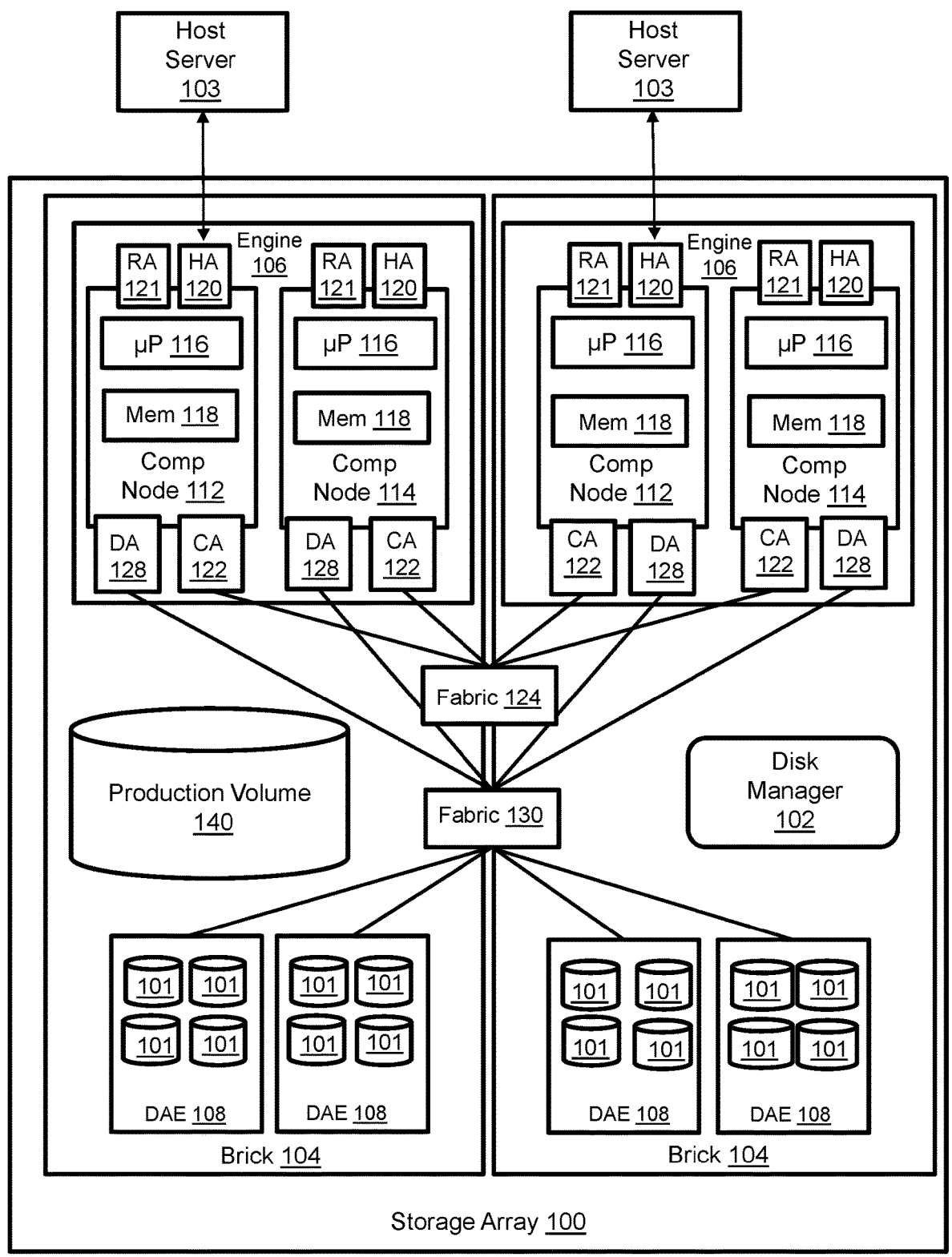
FIG. 1 illustrates a storage array with a disk manager that relocates protection group members to enable storage capacity to be scaled in single disk increments, including new disks that have the same or greater capacity than some or all of the disks in service.

FIG. 1 illustrates a storage array 100 with a disk manager 102 that relocates protection group members to enable storage capacity to be scaled in single disk increments, including addition of new disks that have the same or greater capacity than some or all of the disks in service. The storage array is one example of a storage area network (SAN), which is one example of a data storage system in which the disk manager could be implemented. The storage array 100 is depicted in a simplified data center environment supporting two host servers 103 that run host applications. The storage array would typically support more than two host servers. The host servers 103 include volatile memory, non-volatile storage, and one or more tangible processors. The storage array 100 includes one or more bricks 104. Each brick includes an engine 106 and one or more disk array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g., on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the host servers 103. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems, e.g., for remote mirroring, backup, and replication. Each compute node also includes one or more disk adapters (DAs) 128 for communicating with managed disks 101 in the DAEs 108. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed disks 101 include non-volatile storage media such as, without limitation, solid-state disks (SSDs) based on EEPROM technology such as NAND and NOR flash memory and hard disk disks (HDDs) with spinning disk magnetic storage media. Disk controllers may be associated with the managed disks as is known in the art. An interconnecting fabric 130 enables implementation of an N-way active-active backend. A backend connection group includes all disk adapters that can access the same disk or disks. In some implementations every disk adapter 128 in the storage array can reach every DAE via the fabric 130. Further, in some implementations every disk adapter in the storage array can access every managed disk 101.

Data associated with instances of the hosted applications running on the host servers 103 is maintained on the managed disks 101. The managed disks 101 are not discoverable by the host servers but the storage array creates a logical storage object known as a production volume 140 that can be discovered and accessed by the host servers. Without limitation, the storage object may be referred to as a source device, production device, or production LUN, where the logical unit number (LUN) is a number used to identify logical storage volumes in accordance with the small computer system interface (SCSI) protocol. From the perspective of the host servers 103, the production volume 140 is a single disk having a set of contiguous fixed-size logical block addresses (LBAs) on which data used by the instances of the host application resides. However, the host application data is stored at non-contiguous addresses on various managed disks 101. The compute nodes maintain metadata that maps between the production volume 140 and the managed disks 101 in order to process IOs from the hosts.

Figure 2:
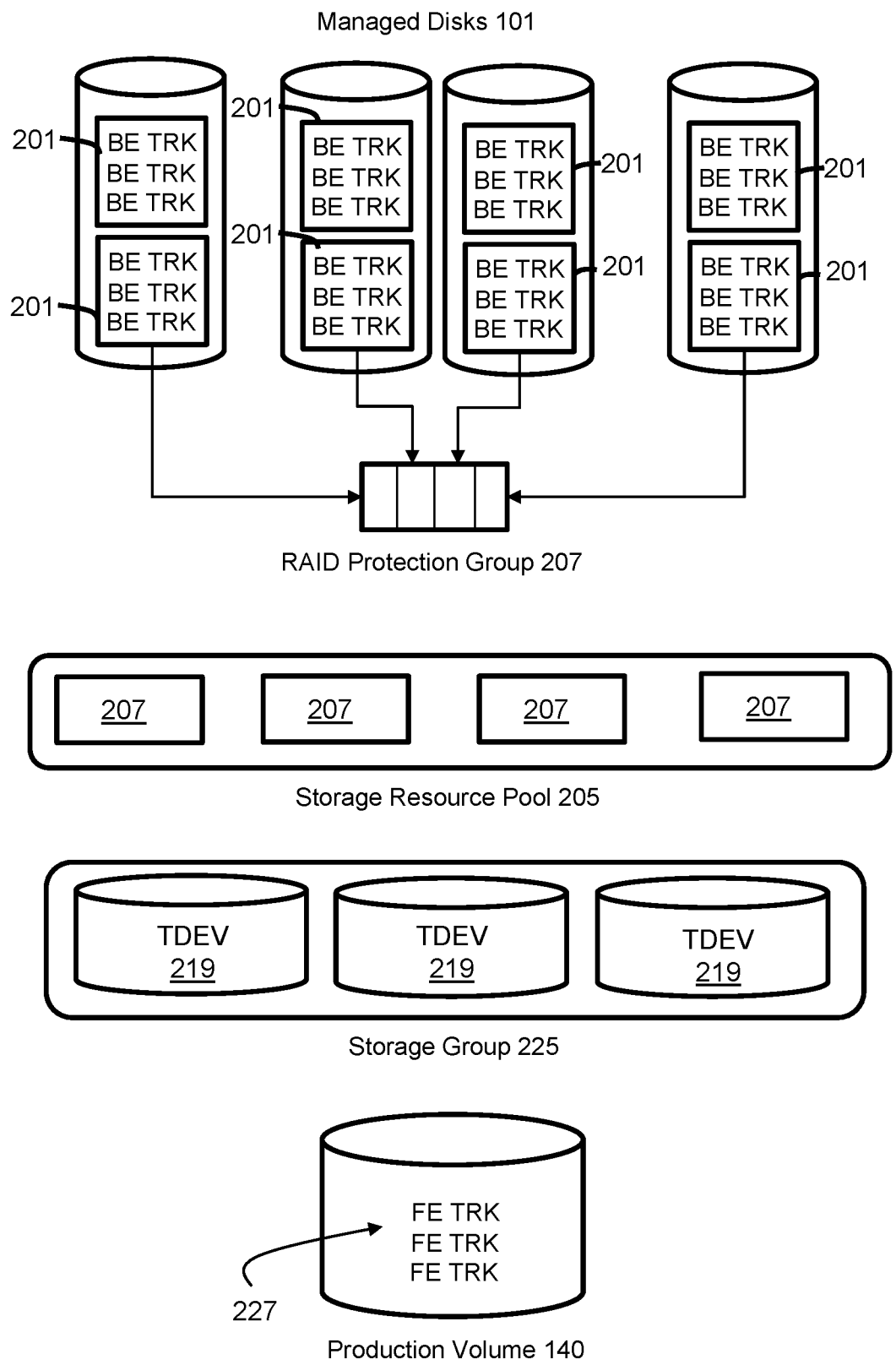
FIG. 2 illustrates layers of abstraction between the managed disks and the production volume of the storage array of FIG. 1.

FIG. 2 illustrates layers of abstraction between the managed disks 101 and the production volume 140. The basic allocation unit of storage capacity that is used by the compute nodes to access the managed disks 101 is a back-end track (BE TRK). In some implementations the compute nodes do not access the managed disks using allocation units other than BE TRKs. BE TRKs all have the same fixed size which may be an integer (greater than 1) multiple of the managed disk sector size. The managed disks 101 are each organized into partitions 201 of equal storage capacity, i.e., every partition has the same fixed size. Each partition 201 may include multiple BE TRKs. Selection of partition storage capacity is a design implementation and, for context and without limitation, may be some fraction or percentage of the capacity of a managed disk equal to an integer multiple of the sector size. Each partition may include a contiguous range of logical addresses. A group of partitions from different managed disks is used to create a RAID protection group 207. In other words, the partitions accommodate protection group members and each partition in a protection group must be on a different managed disk in order to be RAID compliant. In some implementations all of the managed disks associated with a RAID protection group have the same storage capacity. In some implementations some of the managed disks associated with a RAID protection group have the same baseline storage capacity and all other managed disks have an integer multiple of the baseline storage capacity. A storage resource pool 205 is a collection of RAID protection groups 207 of the same type, e.g., RAID-5 (3+1). Logical thin devices (TDEVs) 219 are created from a storage resource pool and organized into a storage group 225. The production volume 140 is created from one or more storage groups. Host application data is stored in front-end tracks (FE TRKs) 227, that may be referred to as blocks, on the production volume 140. The FE TRKs 227 on the production volume 140 are mapped to BE TRKs 200 of the managed disks 101 by metadata. The storage array may create and maintain multiple production volumes.

FIG. 3 illustrates a cluster 300 of baseline size disks. The baseline size disks have the smallest storage capacity (size) of the managed drives. Initially, all the managed drives may be baseline size disks. At least one W-by-W cluster of baseline disks is required to support single baseline disk scaling. Every disk in the cluster, and possibly every one of the managed drives, is configured to have W same-size partitions. A RAID-5 (4+1) implementation will be used for context. The RAID width W=5 because there are 5 disks in a RAID-5 (4+1) protection group. The cluster can be represented as a matrix of dimensions W-by-W, in which each row represents a disk (numbered 1-5), and each column represents a partition (numbered 1-5). The partitions are populated with members of RAID protection groups A through E. The members of each RAID group are distributed vertically, occupying 1 column per matrix, so each protection group is distributed on the same partition across multiple disks. The storage array may include multiple clusters and each managed disk belongs to only one cluster.

FIG. 4 illustrates a relocation sequence matrix 302. The relocation sequence matrix has the same dimensions (W-by-W) as the baseline size disk cluster 300 (FIG. 3). Each row represents a disk (numbered 1-5), and each column represents a partition (numbered 1-5). Conceptually, a new baseline disk can be viewed as a row of W partitions. A new baseline disk will be populated with W RAID members (1 per column) from the baseline disk cluster. The entries in the relocation sequence matrix contain sequence numbers that indicate how the RAID members are selected for relocation. Conceptually, the relocation sequence matrix is overlayed on the baseline disk cluster and groups of protection group members are relocated to new disks in sequence by number, i.e., sequence number 1 members to the first new disk, sequence number 2 members to the second new disk, sequence number 3 members to the third new disk, and so forth. Thus, each sequence number in the relocation sequence matrix indicates the sequential order in which the RAID members at specific rows (disks) and columns (partitions) are relocated. For RAID width W, row number R, and column number C, the RAID member at (R, C) in the cluster is associated with a relocation sequence number N between 1 and W such that if $(R+C \leq W)$ then $N=R+C$; otherwise, $N=R+C-W$.

FIG. 5 illustrates use of the relocation sequence matrix 302 (FIG. 4) to relocate protection group members from the cluster 300 of baseline size disks to a new baseline size disk. A first new baseline size disk (6) is populated with RAID members (A-E) from the baseline disk cluster corresponding to the positions of the first relocation sequence number (1) in the relocation sequence matrix. Conceptually, the relocation sequence matrix is overlaid on the new baseline size disk and protection group members in partitions corresponding to the selected sequence number are relocated to the new baseline size disk. The column (partition) associations are maintained for relocation, i.e., the protection group member in column 1 of the cluster of baseline size disks is relocated to column 1 of the new baseline size disk, the protection group member in column 2 of the cluster of baseline size disks is relocated to column 2 of the new baseline size disk, and so forth. Every resulting RAID group satisfies the RAID requirement of having each member on a different disk.

FIG. 6 illustrates creation of a new protection group in the partitions of the baseline disk cluster 300 that are vacated due to relocations. The free spaces created in the cluster after relocation of protection group members A-E corresponding to the sequence 1 positions in the relocation sequence matrix allow one new RAID group to be created. In the illustrated example, new RAID group U is created.

FIG. 7 illustrates use of the relocation sequence matrix 302 (FIG. 4) to relocate protection group members from the cluster 300 of baseline size disks to a second new baseline size disk (7). The second new baseline disk (7) is populated with RAID members (A-E) from the baseline disk cluster corresponding to the positions of the second relocation sequence number (2) in the relocation sequence matrix. The column (partition) associations are maintained for relocation. The free spaces created in the cluster after relocation of protection group members corresponding to the sequence 2 positions allow one new RAID group to be created. Every resulting RAID group satisfies the RAID requirement of having each member on a different disk.

FIG. 8 illustrates creation of a new cluster 310 of baseline size disks from W added baseline size disks. In the illustrated example, each of the positions in the cluster of baseline size disks is associated with one of five sequence numbers 1-5. After five new disks (6-10) have been added, all of the original protection group members have been relocated from the baseline disk cluster 300 to one of the new disks. New RAID members (U-Y) are distributed within the original disks (1-5) according to the relocation sequence matrix, e.g., as disks are added or when all five disks have been added. The new cluster 310 of baseline size disks created from the five added baseline size disks contains the original protection group members distributed in the original pattern. Thus, the new cluster of baseline disks can be used as the foundation for addition of subsequent baseline size disks in single disk increments.

FIG. 9 illustrates two baseline size disk clusters 320, 322 configured to support adding a new double size disk. A double size disk has double the storage capacity of one baseline disk. Initially, two clusters of baseline size disks are required to support the addition of double-size disks. All disks are divided into W equal-size partitions and RAID-5 (4+1) is illustrated for context. Five RAID protection groups A-E are distributed in single partitions of a first baseline disk cluster 320. Five RAID protection groups F-J are distributed in single partitions of a second baseline disk cluster 322.

FIG. 10 illustrates a relocation sequence matrix 324. The relocation sequence matrix has the same dimensions (W-by-W) as each baseline size disk cluster 320, 322 (FIG. 9). Each row represents a disk (numbered 1-5), and each column represents a partition (numbered 1-5). Conceptually, a new double size disk can be viewed as a row of 2*W partitions. A new double size disk will be populated with 2*W RAID members (1 per column) from the baseline disk clusters 320, 322. The entries in the relocation sequence matrix contain sequence numbers that indicate how the RAID members are selected for relocation. Conceptually, the relocation sequence matrix is overlayed on each baseline disk cluster and groups of protection group members are relocated to new disks in sequence. For RAID width W, row number R, and column number C, the RAID member at (R, C) in the cluster is associated with a relocation sequence number N between 1 and W such that if (R+C≤W) then N=R+C; otherwise, N=R+C−W.

FIG. 11 illustrates use of the relocation sequence matrix 324 (FIG. 10) with the two baseline size disk clusters 320, 322 to relocate protection group members from the baseline size disk clusters to the new double size disk 340. The new double-size disk (6) is populated with RAID members (A-J) associated with the same relocation sequence number (1) from both baseline disk clusters 320, 322. The free spaces created by relocation allow two new RAID groups to be created. Every RAID group still satisfies the RAID requirement of having each member on a different disk.

FIG. 12 illustrates use of the relocation sequence matrix 324 (FIG. 10) with the two baseline size disk clusters 320, 322 to relocate protection group members from the baseline size disk clusters to a second new double size disk 342. The second new double-size disk (7) is populated with RAID members (A-J) associated with the same relocation sequence number (2) from both baseline disk clusters. The free spaces created by relocation allow two more new RAID groups to be created.

FIG. 13 illustrates creation of a new cluster 350 of double size disks from W added double size disks. When 5 new rows (double-size disks) have been added, new RAID members (K-T) have been created and distributed within the two baseline size disk clusters 320, 322 according to the relocation sequence matrix. The original RAID members have been relocated to new double-size disks 6-10 in a separate cluster 350, which resembles a union of the two original clusters 320, 322.

FIG. 14 illustrates use of the relocation sequence matrix 324 (FIG. 10) with the new cluster 350 of double size disks to relocate protection group members to a new double size disk 352. The new cluster of double-size disks comprises two conceptual 5×5 submatrices of disks (6-10). The smaller relocation sequence matrix is conceptually overlaid on each of the submatrices, individually. Clusters of single-size disks are no longer required to support double-size disk adds. When a new double-size disk (11) is added, RAID members A-J associated with sequence 1 will be relocated to the new disk (11). Vacated spaces created by the relocations enable new RAID groups to be created. Subsequent disk additions are implemented by relocation of RAID members associated with other relocation sequence numbers, in sequential order, until 5 disks are added to complete the cycle and form another double size disk cluster. It should be understood that the technique can be applied to other integer multiple size disk clusters relative to the baseline size, e.g., 3× or 4× size disk clusters.

Figure 15:
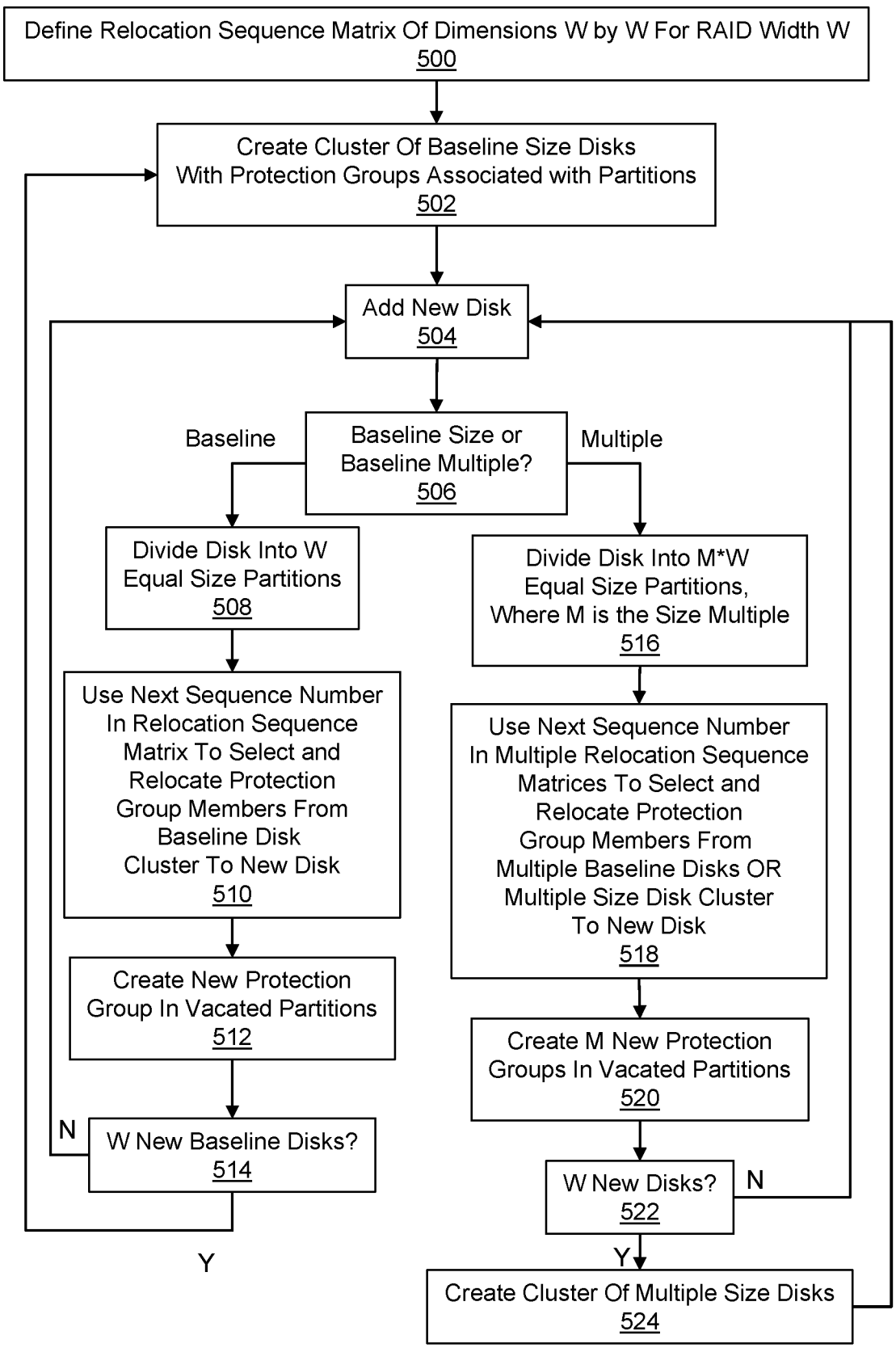
FIG. 15 illustrates steps associated with relocation of RAID members to enable storage capacity to be scaled in single disk increments, including new disks that have greater capacity than some or all of the disks in service.

FIG. 15 illustrates steps associated with relocation of RAID members to enable storage capacity to be scaled in single disk increments, including new disks that have greater capacity than some or all of the disks in service. Step 500 is defining a relocation sequence matrix of dimensions W-by-W for a RAID width W=D+P. Step 502 is creating a cluster of W baseline size disks. The baseline size disks are configured with W partitions. RAID protection groups are created and distributed in the partitions such that each protection group is distributed across multiple disks on the same partition number. Step 504 is adding a new disk. Step 506 is determining whether the new disk is baseline size or an integer multiple of the baseline disk size. At least two baseline disk clusters are needed to support addition of a double size disk so the new disk will be baseline size if the storage system has only a single baseline disk cluster and no larger disk size clusters. As indicated in step 508, the new baseline size disk is divided into W equal size partitions, that are the same size as the partitions of the existing disk cluster. As indicated in step 510, the next sequence number in the relocation sequence matrix is used to select and relocate RAID members from the baseline disk cluster to the new disk. Step 512 is creating a new protection group in the partitions of the baseline disk cluster that are vacated due to the relocations to the new disk. Step 514 is determining whether W new baseline disks have been added. If fewer than W new baseline disks have been added, then steps 504 through 512 are repeated until W new baseline disks have been added. When W new baseline disks have been added then a new cluster of baseline disks is created as indicated in step 502.

Two clusters of baseline size disks are required to support an initial addition of a double size disk. Similarly, three clusters of baseline size disks are required to support an initial addition of a triple size disk. Within those constraints, when a disk having a size multiple M of the baseline size disk is added as determined in step 506 then that disk is divided into M*W same size partitions, which are the same size as the partitions of the baseline disk clusters. Step 518 is using the next sequence number in multiple conceptually overlaid relocation sequence matrices to select and relocate RAID members to the new disk. In the case of initial addition of the multiple size disks, the RAID members are relocated from M baseline disk clusters. In the case of addition of the multiple size disks after creation of a multiple size disk cluster, the RAID members are relocated from the multiple size disk cluster. Step 520 is creating M new protection groups in the partitions vacated as a result of the relocations. Step 522 is determining whether W new multiple size disks have been added. If fewer than W new multiple size disks have been added, then steps 504 through 522 are repeated until W new multiple size disks have been added. When W new multiple size disks have been added then a new cluster of multiple size disks is created as indicated in step 524. Steps 516 through 524 are implemented separately for each multiple size, e.g., double size disks are not added to the same cluster as triple size disks.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
    a storage array comprising:
        at least one compute node comprising at least one processor and non-transitory computer-readable memory;
        a plurality of baseline size non-volatile disks that are accessed by the at least one compute node and used to store data that is accessed via the at least one compute node, each disk configured with W indexed partitions, each partition having a same fixed-size amount of storage capacity equal to storage capacity of other partitions; and
        a disk manager configured to:
            create a cluster of W of the baseline size disks with RAID (D+P) protection groups comprising D data members and P parity members, ones of the RAID (D+P) protection groups associated with ones of W partition indices, where W=D+P; and
            responsive to addition of a new baseline size disk, configure the new baseline size disk with W partitions and relocate selected members of the protection groups from the cluster of baseline disks to the new baseline size disk based on a W-by-W relocation sequence matrix.

2. The apparatus of claim 1 wherein the disk manager is configured to create a new RAID (D+P) protection group in partitions vacated by the selected members of the protection groups.

3. The apparatus of claim 1 wherein the disk manager is configured to create a second cluster of baseline disks using W new baseline size disks.

4. The apparatus of claim 1 wherein the disk manager is configured to use M clusters of baseline size disks to add a multiple size new disk having M times the baseline disk size.

5. The apparatus of claim 4 wherein the disk manager is configured to organize the multiple size new disk into M*W partitions.

6. The apparatus of claim 5 wherein the disk manager is configured to relocate selected members of the protection groups from the M clusters of baseline size disks to the new multiple size disk based on the W-by-W relocation sequence matrix.

7. The apparatus of claim 6 wherein the disk manager is configured to create a new cluster of multiple size disks using W new multiple size disks.

8. The apparatus of claim 7 wherein the disk manager is configured to use the new cluster of multiple size disks to add a subsequent multiple size new disk by relocating selected members of the protection groups from the new cluster of multiple size disks to the subsequent multiple size disk based on the W-by-W relocation sequence matrix.

9. A method implemented by a storage array having at least one compute node with at least one processor and non-transitory computer-readable memory, and a plurality of baseline size non-volatile disks that are accessed by the at least one compute node and used to store data that is accessed via the at least one compute node, each disk configured with W indexed partitions, each partition having a same fixed-size amount of storage capacity equal to storage capacity of other partitions, the method comprising:
    creating a cluster of W of the baseline size disks with RAID (D+P) protection groups comprising D data members and P parity members, ones of the RAID (D+P) protection groups associated with ones of W partition indices, where W=D+P; and
    responsive to addition of a new baseline size disk, configuring the new baseline size disk with W partitions and relocating selected members of the protection groups from the cluster of baseline disks to the new baseline size disk based on a W-by-W relocation sequence matrix.

10. The method of claim 9 comprising creating a new RAID (D+P) protection group in partitions vacated by the selected members of the protection groups.

11. The method of claim 9 comprising creating a second cluster of baseline disks using W new baseline size disks.

12. The method of claim 9 comprising using M clusters of baseline size disks to add a multiple size new disk having a size multiple M times the baseline disk size.

13. The method of claim 12 comprising organizing the multiple size new disk into M*W partitions.

14. The method of claim 13 comprising relocating selected members of the protection groups from the M clusters of baseline size disks to the new multiple size disk based on the W-by-W relocation sequence matrix.

15. The method of claim 14 comprising creating a new cluster of multiple size disks using W new multiple size disks.

16. The method of claim 15 comprising using the new cluster of multiple size disks to add a subsequent multiple size new disk by relocating selected members of the protection groups from the new cluster of multiple size disks to the subsequent multiple size disk based on the W-by-W relocation sequence matrix.

17. A non-transitory computer-readable storage medium stores instructions that when executed by a storage array having at least one compute node with at least one processor and non-transitory computer-readable memory, and a plurality of baseline size non-volatile disks that are accessed by the at least one compute node and used to store data that is accessed via the at least one compute node, each disk configured with W indexed partitions, each partition having a same fixed-size amount of storage capacity equal to storage capacity of other partitions, cause the storage array to perform a method to add storage capacity, the method comprising:
    creating a cluster of W of the baseline size disks with RAID (D+P) protection groups comprising D data members and P parity members, ones of the RAID (D+P) protection groups associated with ones of W partition indices, where W=D+P; and
    responsive to addition of a new baseline size disk, configuring the new baseline size disk with W partitions and relocating selected members of the protection groups from the cluster of baseline disks to the new baseline size disk based on a W-by-W relocation sequence matrix.

18. The non-transitory computer-readable storage medium of claim 17 wherein the method comprises using M clusters of baseline size disks to add a multiple size new disk having a size multiple M times the baseline disk size.

19. The non-transitory computer-readable storage medium of claim 18 wherein the method comprises relocating selected members of the protection groups from the M clusters of baseline size disks to the new multiple size disk based on the W-by-W relocation sequence matrix and creating a new cluster of multiple size disks using W new multiple size disks.

20. The non-transitory computer-readable storage medium of claim 19 wherein the method comprises using the new cluster of multiple size disks to add a subsequent multiple size new disk by relocating selected members of the protection groups from the new cluster of multiple size disks to the subsequent multiple size disk based on the W-by-W relocation sequence matrix.

\* \* \* \* \*